Patented May 16, 1933

1,909,196

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

ESTER OF DIBASIC ACID

No Drawing. Application filed July 27, 1928, Serial No. 295,836. Renewed October 4, 1932.

This invention relates to the art of esters of dibasic acids, and more particularly to esters of polyhydroxy compounds containing at least two free hydroxyl groups.

I have found that a new class of compounds comprising esters of dibasic acids can be prepared by esterifying at least one acid group of a dibasic acid with an aliphatic polyalcohol in which one or more hydroxyl groups have been substituted by hydrocarbon ether groups. I have also found that this can be accomplished by esterifying only one acid group in the manner indicated and esterifying the second acid group with a monohydric alcohol or an ether alcohol.

By the term "hydrocarbon ether group", as used herein, I mean a radical OR which is capable of replacing an hydroxyl group, and in which R is a hydrocarbon radical. By the term "hydrocarbon ether of an aliphatic polyalcohol", as used herein, I mean polyalcohols or their derivatives in which at least one hydroxyl group has been replaced by a radical OR in which R is a hydrocarbon group.

It is therefore an object of this invention to produce a new class of compounds comprising esters of dibasic acids in which at least one acid group is esterified with an aliphatic polyalcohol containing hydrocarbon ether groups.

It is also an object of this invention to produce a new class of compounds comprising esters of dibasic acids in which one acid group is esterified with an aliphatic polyalcohol containing hydrocarbon ether groups and in which the other acid group is esterified with a monohydric alcohol.

It is another object of this invention to produce compositions containing these esters.

With the above and other objects in view, which will be apparent as the description proceeds, I have set forth below several embodiments of my invention by way of illustration and not as a limitation.

Example 1

Seventy-four parts by weight of phthalic anhydride are heated with sixty parts by weight of monoethylin for two and one-half hours in an oil bath maintained at approximately 140° C. This yields a viscous, straw colored liquid—monoethylin acid phthalate—having the following structural formula:

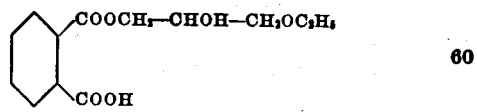

Example 2

Monoethylin acid phthalate is prepared as indicated in Example 1 and this is converted to butyl monoethylin phthalate by heating it with an excess of butyl alcohol in a flask connected with a hydrogen chloride generator for six hours in an oil bath at about 160° C.

In this way practically all the excess butyl alcohol is distilled off, carrying with it all the water that has been formed in the course of esterification and the hydrogen chloride added intermittently in the first part of the operation. The residue is then distilled under diminished pressure, yielding butyl monoethylin phthalate, which is a light straw colored liquid that is stable toward light and does not darken with age. This boils at about 231 to 232° C. under 7 mm. pressure and has the following structural formula:

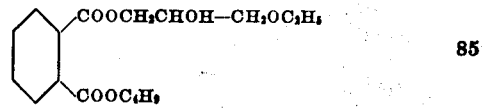

Example 3

Dimonoethylin phthalate is prepared by heating phthalic anhydride with monoethylin in the proportion of one mol phthalic anhydride with two mols of monoethylin at about 140° C. until complete solution has taken place. A small amount of gaseous hydrogen chloride, or its aqueous solution, is then added and the mixture further heated at the same temperature until the theoretical amount of water has split out and distilled off. It is sometimes desirable to add more hydrogen chloride as the reaction progresses. I have found that .1 mol hydrogen chloride is sufficient for each addition. The resulting product is a light straw colored liquid, more viscous than monoethylin acid phthalate, and has the following structural formula:

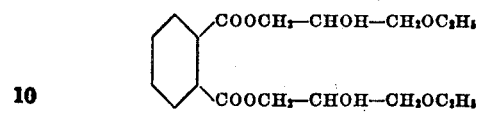

It will be apparent that many modifications of these compounds may be made in a similar manner, as other dibasic acids or their anhydrides, such as hydroxy phthalic acids, oxalic acid, or succinic acid, may be substituted for phthalic anhydride, or phthalic acid, and other hydrocarbon ethers of polyhydric derivatives, such as other monoalkylethers of glycerine, monoaryl ethers of glycerine, dialkyl or diaryl ethers of glycerine, pentaerythrite, mannitol or sorbitol may be substituted for monoethylin. For example, by using monobenzylin and phthalic anhydride, monabenzylin acid phthalate and butyl monobenzylin phthalate may be prepared instead of monoethylin acid phthalate and butyl monoethylin phthalate.

Ethers of hexahydric alcohols, particularly sorbitol, and compositions containing them, are claimed specifically in my copending application, Serial No. 489,483, filed October 17, 1930.

These various compounds falling within my invention may be represented by the following structural formula:

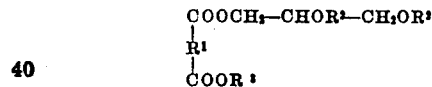

in which $R^1$ is a monocyclic aryl or alkyl group; either $R^2$ represents hydrogen, an alkyl group, or a monocyclic aryl group; and $R^3$ is either hydrogen or an alkyl group.

In making these compounds care should be taken that the reaction temperature is not maintained so high that the secondary alcohol groups on the hydroxy ether are also esterified, but inasmuch as the latter reaction is above the normal temperature in esterification operations, it is easily avoided by using ordinary care. Either the acid or its anhydride may be employed but the latter is preferred because the amount of water to be removed is thereby decreased.

These compounds are useful for a wide variety of uses, such as solvents, and as plasticizers or softeners for cellulose derivatives like cellulose nitrate, cellulose acetate, and ethyl cellulose.

These compositions can be formed by adding my new esters of diabasic acids to suitable compositions, of which I mention the following by way of illustration:

*Example 4*

| | Parts by weight |
|---|---|
| Cellulose nitrate | 15 |
| Plasticizer | 4.5 |
| Solvent (85% ethyl acetate, 15% ethyl alcohol) | 80.5 |

This yields a film of exceptional toughness.

*Example 5*

| | Parts by weight |
|---|---|
| Cellulose acetate | 6 |
| Plasticizer | 3 |
| Solvent (acetone) | 75 |

This yields a tough film of exceptional clarity.

*Example 6*

| | Parts by weight |
|---|---|
| Ethyl cellulose | 8 |
| Plasticizer | 2 |
| Solvent (50% benzene, 50% xylene) | 80 |

The esters used as plasticizers may be of different types as set forth in Examples 1, 2 and 3 and the modifications discussed thereafter, but I prefer to use the neutral type because of their stability toward other compounds, such as zinc oxide, which may be added for various purposes, e. g. as a pigment, to their mixtures with cellulose derivatives.

The compositions with cellulose derivatives described herein are valuable in making lacquers, imparting toughness to the film and added gloss to the surface; they may be used as sheets, such as are employed for automobile curtains or motion picture films; they may also be employed as leather substitutes, such as Fabrikoid; and they may be used as plastics and in molding compositions of various kinds.

It will therefore be apparent that I have produced new and useful esters of dibasic acids and compounds embodying same, as well as a process of making these esters, which esters and compounds are useful for a wide variety of purposes.

I have found that glycol ether phthalates are not satisfactory for use as plasticizers, because they have such low boiling points that they are volatilized out of compositions containing them, hence I desire to exclude them from the scope of the present application.

As many apparently widely different embodiments of this invention may be made without departing from the spirit thereof, it is to be understood that I do not limit myself to the foregoing examples, proportions or descriptions, except as indicated in the following patent claims.

I claim:

1. As a new composition of matter, an ester of a dibasic acid, at least one acid group of which has been esterified with a hydrocarbon ether of an aliphatic polyalcohol originally containing more than two hydroxyl groups.

2. As a new composition of matter, an ester of a dibasic acid, at least one acid group of which has been esterified with a hydrocarbon ether of an aliphatic polyalcohol originally containing three to six hydroxyl groups.

3. As a new composition of matter, an ester of a dibasic acid, one acid group of which has been esterified with a hydrocarbon ether of an aliphatic polyalcohol originally containing more than two hydroxyl groups, and the other acid group of which has been esterified with a member of the group which consists of monohydric alcohols and ether alcohols.

4. As a new composition of matter, an ester of a dibasic acid, one acid group of which has been esterified with a hydrocarbon ether of an aliphatic polyalcohol originally containing three to six hydroxyl groups, and the other acid group of which has been esterified with a member of the group which consists of monohydric alcohols and ether alcohols.

5. As a new composition of matter, an ester of a dibasic acid, one acid group of which has been esterified with a hydrocarbon ether of an aliphatic polyalcohol originally containing more than two hydroxyl groups, and the other acid group of which has been esterified with a monohydric alcohol.

6. As a new composition of matter, an ester of a dibasic acid, one acid group of which has been esterified with a hydrocarbon ether of an aliphatic polyalcohol originally containing more than two hydroxyl groups, and the other acid group of which has been esterified with butyl alcohol.

7. As a new composition of matter, an ester of a dibasic acid, one acid group of which has been esterified with a hydrocarbon ether of an aliphatic polyalcohol originally containing three to six hydroxyl groups, and the other acid group of which has been esterified with butyl alcohol.

8. A composition of matter having the following structural formula:

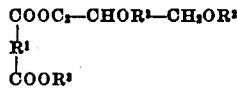

in which $R^1$ is a monocyclic aryl or alkyl group; either $R^2$ represents hydrogen, an alkyl group or a monocyclic aryl group; and $R^3$ is hydrogen or an alkyl group.

9. A composition of matter having the following structural formula:

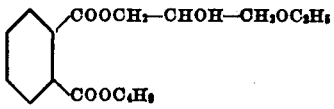

10. Butyl monoethylin phthalate.

11. The process of making esters of dibasic acids which comprises heating a dibasic acid or its anhydride with a hydrocarbon ether of an aliphatic polyalcohol originally containing more than two hydroxyl groups in an oil bath until one of the carboxyl groups has been esterified with the ether of the polyalcohol.

12. The process of making esters of dibasic acids which consists in heating a dibasic acid or its anhydride with a hydrocarbon ether of glycerine in an oil bath until one of the carboxyl groups has been esterified with ether of glycerine, and then heating the resulting product with an excess of an aliphatic alcohol and a small amount of hydrogen chloride as a catalyst, until the second carboxyl group has been esterified, removing the excess alcohol, water and hydrogen chloride, and distilling the residue under diminished pressure.

13. The process of making esters of dibasic acids which consists in heating 74 parts by weight of phthalic anhydride with 60 parts by weight of monoethylin for 2½ hours in an oil bath maintained at approximately 140° C., and then heating the resulting product with an excess of butyl alcohol in the presence of a small amount of hydrogen chloride as a catalyst for six hours in an oil bath at approximately 160° C., to complete the esterification and remove excess alcohol, water and hydrogen chloride, and distilling the residue under diminished pressure.

In testimony whereof, I affix my signature.

WALTER E. LAWSON.

Certificate of Correction

Patent No. 1,909,196. May 16, 1933.

WALTER E. LAWSON

It is hereby certified that error appears in the printed specification of the above-numbered patent requiring correction as follows: Page 3, line 50, claim 8, in the first line of formula, for "$COOC_2-CHOR^2-CH_2OR^3$" read $COOCH_2-CHOR^2-CH_2OR^3$;

and that the said Letters Patent should be read with this correction therein that the same may conform to the record of the case in the Patent Office.

Signed and sealed this 20th day of June, A. D. 1933.

[SEAL]

M. J. MOORE,
*Acting Commissioner of Patents.*